Nov. 19, 1935. C. B. COOK 2,021,292
STERILIZING DEVICE
Filed Aug. 7, 1933  3 Sheets—Sheet 3
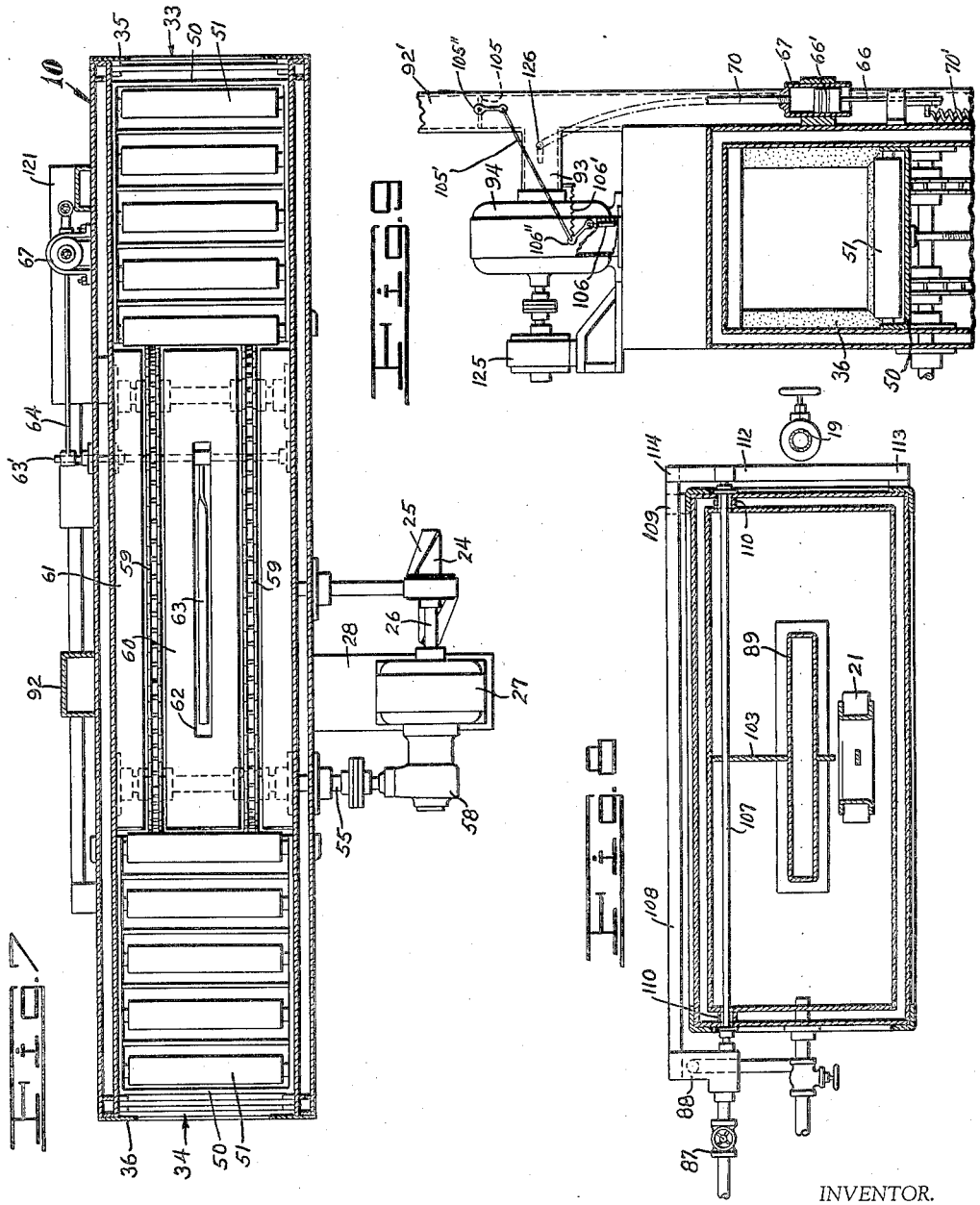
INVENTOR.
C. B. COOK.
BY
ATTORNEY.

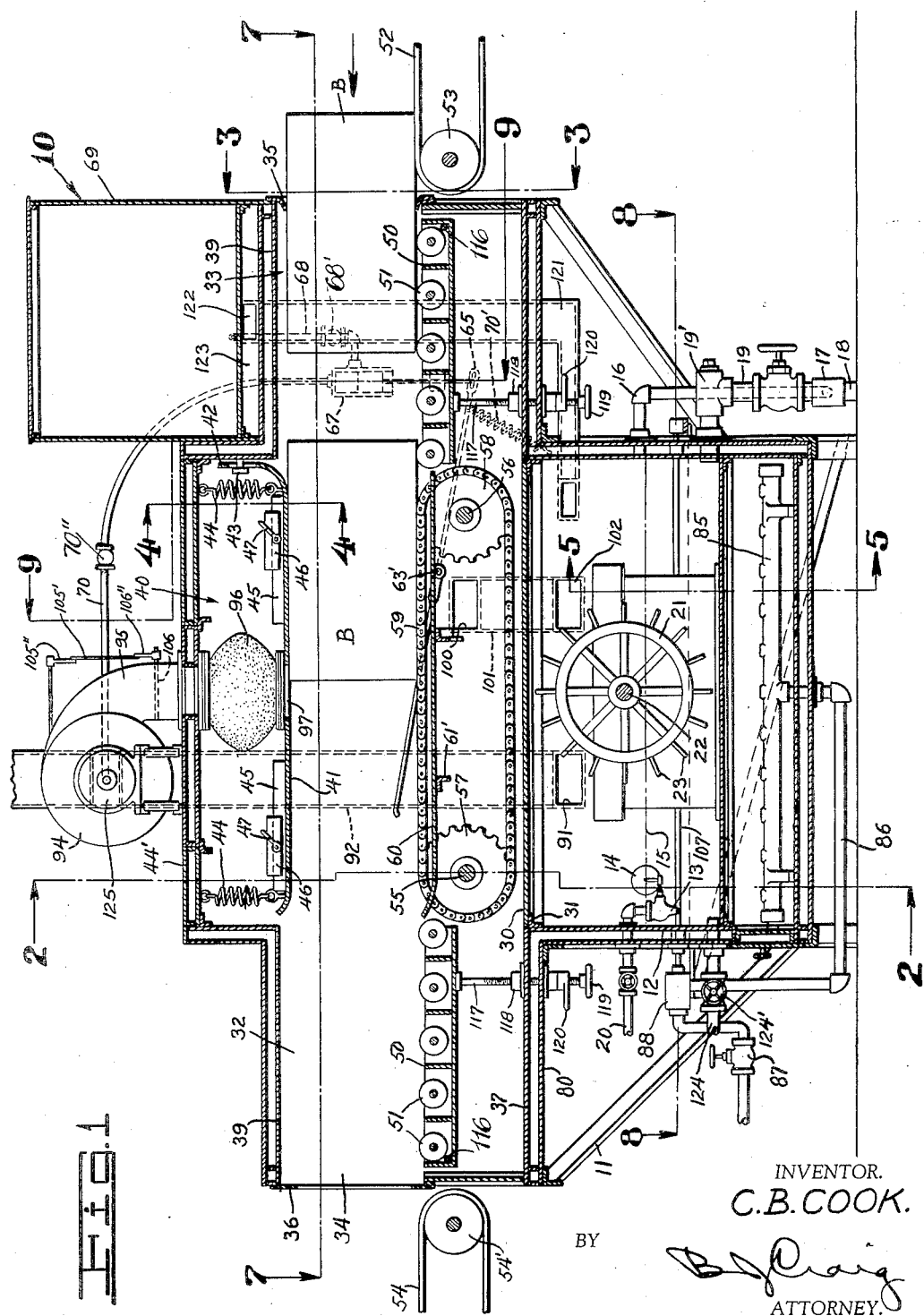

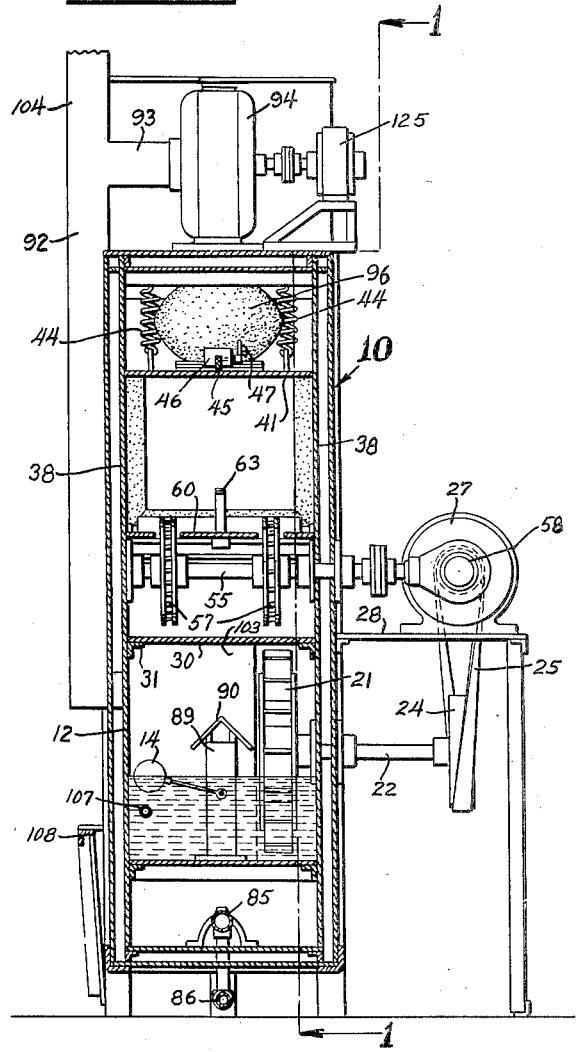
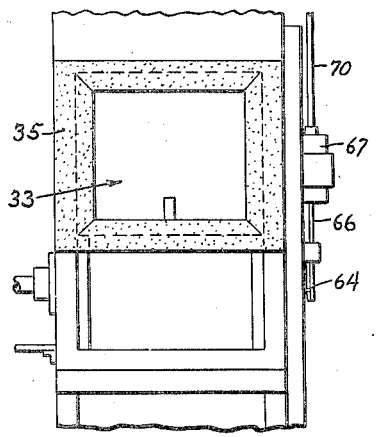
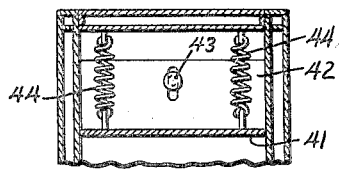
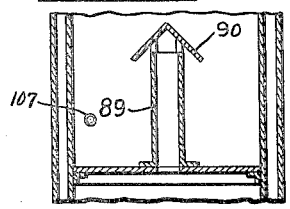
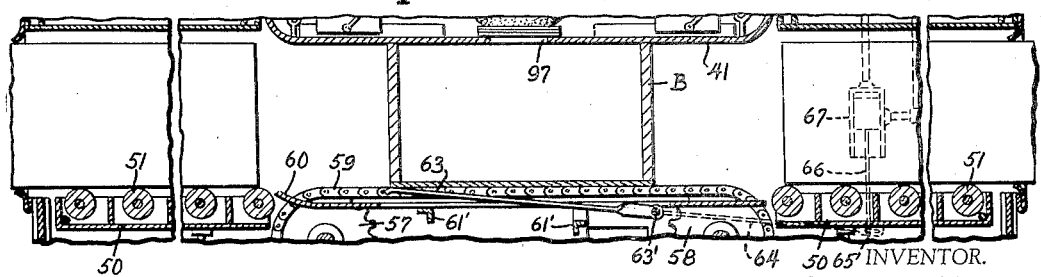

Patented Nov. 19, 1935

2,021,292

UNITED STATES PATENT OFFICE 2,021,292

STERILIZING DEVICE

Charles B. Cook, Los Angeles, Calif.

Application August 7, 1933, Serial No. 684,011

12 Claims. (Cl. 99—18)

This invention relates to sterilizing devices.

The general object is to provide an apparatus for sterilizing containers.

A more specific object is to provide a sterilizer for passing fluids into and through citrus field boxes.

A further object is to provide a means which forces heated products of combustion through an open container.

Another object is to provide an apparatus including a container having an entrance and an exit together with novel means for sterilizing a container while it passes through the apparatus.

Another object is to provide a novel apparatus for forcing heated products of combustion through an open top receptacle.

Other objects of the invention will be apparent from the following description taken in connection with the accompanying drawings wherein:

Fig. 1 is a longitudinal section partly in elevation taken on line 1—1 of Fig. 2, showing my apparatus;

Fig. 2 is a section taken on line 2—2 of Fig. 1;

Fig. 3 is a section taken on line 3—3 of Fig. 1;

Fig. 4 is a section taken on line 4—4 of Fig. 1;

Fig. 5 is a section taken on line 5—5 of Fig. 1;

Fig. 6 is a fragmentary sectional detail showing the conveyor members;

Fig. 7 is a section taken on line 7—7 of Fig. 1;

Fig. 8 is a section taken on line 8—8 of Fig. 1;

Fig. 9 is a section taken on line 9—9 of Fig. 1.

Referring to the drawings by reference characters, I have indicated my sterilizing device generally at 10.

As shown the device 10 is mounted on a suitable frame 11 and includes a lower tank 12. In this tank is a valve 13 which is controlled by a float 14 to maintain a water level 15 in this tank. The tank is provided with an over-flow 16 which communicates through a fitting 17 with a sewer line 18. The fitting 17 also communicates through a drain pipe 19 with the tank 12. The drain pipe 19 may be opened for use by turning a valve 19' so that the tank may be cleaned out when desired. Water is supplied to the valve 13 through a supply pipe 20.

Mounted within the tank 12, I show an aerating device indicated as a wheel 21 mounted on a shaft 22 and having vanes 23 thereon. The shaft 22 is disposed above the normal water level 15 and as this shaft rotates the wheel 21 the vanes 23 agitate and stir up the water and aerate the same. The shaft 22 passes through the wall of the tank 12 and has a pulley 24 thereon which is driven by a belt 25 from a pulley on a shaft 26. The shaft 26 is secured to the armature shaft of an electric motor 27 which is mounted on a platform 28.

The upper portion of the tank 12 is closed by a removable closure 30 which is disposed on an angle-iron 31 as shown in Fig. 1. Above the tank 12, I show a sterilizing chamber 32 which has an entranceway 33 and an exitway 34. The entrance 33 and the exit 34 have inwardly projecting canvas or rubber strips 35 and 36, respectively, about the periphery thereof and these strips are of a size to engage a box B as it enters the chamber 32 and as it passes therefrom and thereby prevent passage of fluid around the box.

The chamber 32 includes a bottom 37, sides 38 and end top portions 39. The bottom 37 is in alignment with the closure 30. Intermediate the end top portions 39 the chamber is enlarged as at 40 and in this enlarged portion I mount a movable plate 41 shown as having at one end a member 42 slidably mounted on pin 43. The weight of the plate 41 is counter-balanced by springs 44 having one end attached to the plate 41 and the other end attached to the bottom of a closure 44' which closes the upper portion of the part 40 of the chamber.

The plate 41 is provided with longitudinal ribs 45 on which weights 46 slide. The weights are clamped to the ribs 45 by clamping screws 47. In this manner any desired balance of the plate 41 can be secured by shifting the weights 46. Thus it will be apparent that the plate 41 may by loosening the screws be adjusted after which the screws 47 are tightened. This allows the drag on a box passing to be adjusted.

Within the chamber 32 at each end thereof I provide a conveyor frame at 50 which has conveyor rolls 51 mounted thereon. An endless conveyor belt 52 mounted on a pulley 53 delivers boxes at the entranceway 33 and a second endless conveyor 54 mounted on a pulley 54' conveys boxes from the exit way 34.

Intermediate the conveyors 50 I mount a pair of shafts 55 and 56 and on each shaft I arrange two sprockets 57 and two sprockets 58. Over on these sprockets I arrange a pair of conveyor chains 59, the upper reach of which is in substantial alignment with the upper portion of the conveyor rolls 51. The shaft 55 is driven by a speed reduction gear 58 from the motor 27 as shown in Fig. 7.

Intermediate the chains 59, I mount a plate 60 and between each chain and the adjacent outer wall of the tank I mount another plate 61 as shown in Fig. 7. The plates 60 and 61 are supported on transverse members 61' as shown.

The plate 60 is slotted as at 62 and in this slot I mount a lever 63 which is mounted on a shaft 63'. This lever projects in the path of movement the boxes on the chains 59 and the lever is depressed to rock the shaft 63' as each box passes thereover. The shaft 63' has an arm 64 thereon and this arm is slotted at 65 to receive a pin on a rod 66 which is connected to a piston 66' in a cylinder 67. This cylinder communicates through a pipe 68 with an oil supply tank 69 and also communicates through a pipe 70 with a conduit to be presently described. The construction is such that each time the lever 67 is depressed it forces a quantity of oil from the cylinder 67 through the pipe 70 and each time the lever moves to the position shown in Fig. 1 by the action of a spring 70' the cylinder 67 is again filled with oil from the tank 69.

It will be understood that the pipe 68 includes a one-way valve 68' which allows oil to pass to the cylinder 67 but prevents return of oil from the cylinder 67 to the tank 69 and that the pipe 70 includes a one-way valve at 70'' which prevents oil re-entering the cylinder from the pipe 70. The tank 12 and the chamber 32 are provided with outer metal members 80 which are spaced from the walls of the tank and chamber to provide a space outside of the tank and chamber. This space is exhausted to provide a partial vacuum to thereby heat insulate the container and chamber.

A gas burner 85 is mounted beneath the container 12 and is provided with a supply pipe line 86 controlled by a valve 87. A thermostat operated valve 88 to be later described controls the flow of gas to the burner 85. The products of combustion from the burner 85 impinge upon the lower wall of the tank 12 and heat this lower wall and the water in the tank and then pass to a stack 89, which has a roof 90 thereon, thence into the tank 12 whence they are drawn through an opening 91 in the tank into a conduit 92 which communicates at 93 with a blower 94, the outlet 95 of which communicates through a collapsible diaphragm 96 with a discharge opening 97 on the plate 41.

The heated products of combustion pass into the chamber 32 and downwardly into a box B, the open face of which is beneath the outlet 97. The volume of heated products delivered by the blower is such that the heated products of combustion together with the oil which has been taken from the tank 69 and injected into the conduit 92 surge through the box B passing through all cracks and crevices and permeating the pores of the box to destroy mealy bugs and other sources of contamination to fruit on the surface of the box and in the cracks thereof. A metal box may also be treated with my apparatus.

From the chamber 32 the products of combustion pass through an opening 100 and through a conduit 101 to another opening 102 in the container 12 so that the circulation is first through the conduit 92 and then through the conduit 100. Between the openings 91 and 102 I provide a transverse partition 103 in the chamber 12 (see Fig. 8). This partition causes the circulation from the aperture 102 to the aperture 91 to pass adjacent the wheel 21. The conduit 92 includes an upwardly extending portion 92' the passageway through which is controlled by a damper 105 which is actuated by a pivoted plate 106 positioned in the conduit 95 and the construction is such that when the blower 94 is operating, the draft through the conduit 95 swings the plate 106 downward thereby closing the damper 105 and when the blower 94 ceases to operate, a spring 106' swings the plate 106 upward thereby opening the damper 105 to allow the products of combustion to pass to the atmosphere.

The plate 106 includes an operating arm 106'' which is connected by a rod 105' to an operating arm 105'' of the damper 105.

As shown the thermostat operated valve 88 includes a thermo-responsive rod 107 which is positioned in the chamber 12. The thermostat valve device 88 is mounted adjacent one end of a bar 108 the opposite end of which is secured to the frame 11 as at 109. The rod 107 extends through sleeve members 110 at each end of the housing and is connected at one end with the thermo valve 88 and at the opposite end is secured to a bar 112. The bar 112 is secured adjacent one end to the frame 11 as at 113 and at the opposite end to the bar 108 as at 114. The rod 107 is free in the sleeves 110 so that expansion or contraction of the housing does not move the thermo rod. When the temperature of the water in the tank 12 rises to a predetermined degree the rod 107 expands and operates the valve 88 to reduce the flow of gas to the burner 85 and when the temperature of the water falls below a predetermined degree the rod 107 contracts to operate the valve 88 to increase the flow of gas to the burner.

As shown each conveyor frame 50 is pivotally mounted adjacent its outer end on a rod 116 and the opposite end is supported by a threaded member 117. The member 117 is positioned in a threaded boss 118 and at the lower end of the member 117, I provide a hand wheel 119. To prevent accidental movement of the member 117 I provide a lock nut 120.

A conduit 121 extends from the tank 12 and opens through an opening 122 into a chamber 123 beneath the oil supply tank 69. The heated products of combustion enter the chamber 123 and serve to maintain the oil in the container 69 in a heated condition.

For flushing the tank 12 I provide a large water supply pipe 124 having a control valve 124' interposed therein.

The blower 94 is shown as driven by an electric motor 125. The end of the pipe 70 opposite the cylinder 67 enters the conduit 93 as indicated at 126. Thus each time a box operates the piston 66' of the cylinder 67 a quantity of oil is sprayed into the conduit 93 and passes into the sterilizing chamber 32 with fumes forced thereinto by the blower 94.

From the foregoing description it will be apparent that as the boxes pass through my improved apparatus the heated products of combustion together with the oil injected therein will be forced into and through the cracks in the boxes and into the pores thereof to thoroughly impregnate the same thus destroying any mealy bugs or other animal or vegetable growth and also greatly adding to the life of the container.

Having thus described my invention, I claim:

1. In a sterilizer a chamber having an entranceway and an exit, a conveyor in said chamber, means to force heated products of combustion into the chamber, means to inject oil into the heated products of combustion prior to the entrance of the heated products of combustion into the chamber and means operated by a container on said conveyor to actuate said oil operating means.

2. In a sterilizer a chamber having an entranceway and an exit, a conveyor in said chamber, means associated with said chamber to produce heated products of combustion, a tank adapted to contain water, means to direct the heated products of combustion into the tank, means to humidify the heated products of combustion while in the tank, means affording communication between the tank and the chamber and means to draw the heated products of combustion from the tank and discharge into the container.

3. In a sterilizer a chamber having an entranceway and an exitway, a conveyor in said chamber, said chamber including a bottom, sides and a top, said chamber including a discharge outlet, a conduit, means connecting said conduit and said discharge outlet, a tank, a heating device, means to discharge fluid from the heating device into the tank, means communicating with said tank, means to direct the fluid from the tank into the chamber and into a box on the conveyor, and means to return the fluid from the chamber to the tank.

4. In a sterilizer a chamber having an entranceway and an exit, a conveyor in said chamber, means to force heated fluid into the chamber, means to inject oil into the heated fluid prior to the entrance of the fluid into the chamber, means operated by a container on said conveyor to actuate said oil injecting means, a container for oil, means to place said container in communication with said oil injecting means and means to heat said oil container.

5. In a sterilizer, a chamber having an entranceway and an exit, conveyor means in said chamber adapted to move receptacles therethrough, a tank associated with said chamber, a heating means associated with said tank and arranged to discharge heated air into said tank, and means to direct the heated air from said tank and to discharge it into the chamber, said chamber including spaced evacuated walls, said last mentioned means including a discharge opening disposed to discharge into the open side of a box in the chamber.

6. In a sterilizer, a chamber having an entranceway and an exit, flexible means in said entranceway and in said exit to engage four sides of the end of a receptacle, conveyor means in said chamber adapted to move receptacles therethrough, a tank adjacent said chamber, a burner associated with said tank, said burner including a stack for the products of combustion, said stack discharging into said tank, means to draw the products of combustion from said tank and to discharge the products of combustion into the chamber, said last mentioned means including a discharge opening disposed to discharge into the open side of a box into the chamber, and means to moisten the products of combustion.

7. In a sterilizer, a chamber having an entranceway and an exit, flexible means in said entranceway and in said exit to engage four sides of the end of a receptacle, conveyor means in said chamber adapted to move receptacles therethrough, a tank below said chamber, a burner associated with said tank, said burner including a stack for the products of combustion, said stack discharging into said tank, means to supply water to said tank, means to draw the products of combustion from said tank and to discharge the products of combustion into the chamber, said last mentioned means including a discharge opening disposed to discharge into the open side of a box located in the chamber, means to inject fluid into the products of combustion during their movement, means to moisten the products of combustion and means to cause fluid vapor in the chamber to return to the tank.

8. In a sterilizer a chamber having an entranceway and an exitway, a conveyor in said chamber, said chamber including a bottom, sides and a top, said top including a discharge outlet, a conduit, means connecting said conduit and said discharge outlet, a tank adapted to contain water, means to heat the water, means to discharge the products of combustion from the heating means into the tank, means communicating with said tank to direct the products of combustion from the tank into the chamber and into a box on the conveyor, means to return the products of combustion from the chamber to the tank, thermostatically controlled means to control the operation of the water heating means, a container for oil and injecting means adapted to inject oil from the container into the conduit.

9. In a sterilizer a chamber having an entranceway and an exitway, a conveyor in said chamber, said chamber including a bottom, sides and a top, said top including a discharge outlet, a conduit, means connecting said conduit and said discharge outlet, a tank adapted to contain water, means to heat the water, means to discharge the products of combustion from the heating means into the tank, means to moisten the heated products of combustion in the tank, means communicating with said tank to direct the products of combustion from the tank into the chamber and into and through a box on the conveyor, means to return the products of combustion from the chamber to the tank, means to control the movement of the products of combustion in the conduit, thermostatically controlled means to control the operation of the water heating means, a container for oil, and injecting means adapted to inject oil from the container into the conduit.

10. In a sterilizer a chamber having an entranceway and an exitway, a conveyor in said chamber, said chamber including a bottom, sides and a top, said top including an intermediate portion, means to adjustably mount said intermediate portion for movement towards and from said conveyor, said intermediate portion including a discharge outlet, a conduit, extensible means connecting said conduit and said discharge outlet, a tank adapted to contain water, means to heat the water, means to discharge the products of combustion from the heating means into the tank, means to moisten the heated products of combustion in the tank, means communicating with said tank to direct the products of combustion from the tank into the chamber and into and through a box on the conveyor, means to return the products of combustion from the chamber to the tank, means to control the movement of the products of combustion in the conduit, thermostatically controlled means to control the operation of the water heating means, a container for oil, means to heat the container and injecting means adapted to inject oil from the container into the conduit and means operated by a container on said conveyor to actuate said injecting means.

11. In a sterilizer a chamber having an entranceway and an exitway, a conveyor in said chamber, said chamber including a bottom, sides and a top, said top including an intermediate portion, means to adjustably mount said intermediate portion for movement towards and from said conveyor, said intermediate portion including a discharge outlet, a conduit, extensible means connecting said conduit and said discharge outlet, a tank adapted to contain water, means to heat the water, means to discharge the products of combustion from the heating means into the tank, means to moisten the heated products of combustion in the tank, means communicating with said tank to direct the products of combustion from the tank into the chamber and into and through a box on the conveyor, means to return the products of combustion from the chamber to the tank, means to control the movement of the products of combustion in the conduit, thermostatically controlled means to control the operation of the water heating means, a container for oil, and injecting means adapted to inject oil from the container into the conduit.

12. In a sterilizer a chamber having an entranceway and an exit, a conveyor for open sided boxes in said chamber, there being a sterilizing station within said chamber, means to form a closure for the open side of the box while at the sterilizing station, means associated with said chamber to produce heated gases under pressure, means to deliver the heated gases under pressure into a box at the sterilizing station, means to inject sterilizing material into the heated gases prior to their entrance into a box in the chamber, and means to prevent the box being forced from its sterilizing station by the sterilizing gases under pressure which enter the box.

CHARLES B. COOK.